A. AICHELE.
STARTING OF ALTERNATING CURRENT MOTORS.
APPLICATION FILED MAY 7, 1914.
1,192,488. Patented July 25, 1916.
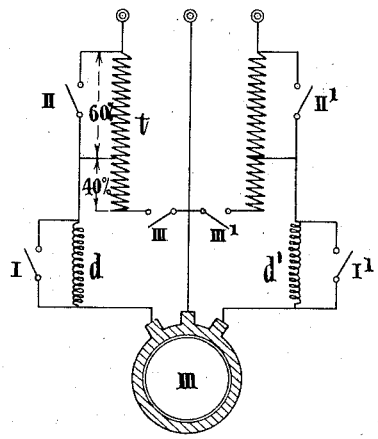
WITNESSES:
INVENTOR:
Albert Aichele,
BY
ATTORNEYS

UNITED STATES PATENT OFFICE.

ALBERT AICHELE, OF BADEN, SWITZERLAND, ASSIGNOR TO AKTIENGESELLSCHAFT BROWN BOVERI & CIE., OF BADEN, SWITZERLAND.

STARTING OF ALTERNATING-CURRENT MOTORS.

1,192,488.  Specification of Letters Patent.  Patented July 25, 1916.

Application filed May 7, 1914. Serial No. 837,037.

*To all whom it may concern:*

Be it known that I, ALBERT AICHELE, a citizen of the Swiss Republic, and residing at Baden, Switzerland, have invented certain new and useful Improvements in and Relating to the Starting of Alternating-Current Motors, of which the following is a specification.

This invention relates to the starting of three-phase alternating current motors by means of starting transformers and choking coils.

When starting a three-phase alternating current motor by means of a starting transformer and choking coils, the first important point to which attention has to be paid is so to dimension the lowest voltage step that the strength of the starting current does not exceed a maximum permissible value. In those cases where this voltage step is comparatively low, it is not possible without a great rush of current to pass over from this first voltage step directly to the voltage in the mains. Intermediate steps, however, may be provided, and the passing over from step to step may be effected with the aid of a choking coil. Certain difficulties occur in such cases.

The object of this invention is to overcome the above disadvantages.

The invention in brief consists in a method and means for starting three-phase alternating current motors by means of a starting transformer and choking coils in which the choking coils are of electrical dimensions to take the maximum starting current, the coils being arranged between the motor and the tapping points of single-step auto-transformers, starting gradually being effected by first short-circuiting the choking coil, then disconnecting the neutral point of the transformer from the system and finally short-circuiting the part of the transformer conveying current.

The diagram illustrates one arrangement according to the present invention.

In the form illustrated each limb of an auto-transformer $t$ is provided with a single tapping point and connected at such point to the motor $m$ by way of a choking coil $d$ as regards one phase and $d'$ as regards another. Switches I and I$^1$ are connected across these inductances and switches II and II$^1$ across the part of the auto-transformer remote from them. Switches III and III$^1$ can connect or disconnect the neutral point of the transformer. The tapping point in the transformer may be made for 40% voltage. The choking coils $d$ and $d'$ should be of suitable electrical dimensions to give the maximum permissible starting current.

In operation starting is effected as follows:—

| Step. | Switching. | Motor voltage. |
|---|---|---|
| 1 | III closed | 40% less inductance drop |
| 2 | I closed | 40% |
| Intermediate (a) | III opened | 60% |
| 3 | II closed | 100% |

The improved method described above requires only one tapping to the transformer and only one intermediate step for a three-step regulation. As for the choking coil it is never connected in parallel with a section of the transformer, so that the high magnetizing currents, which constitute a current load on the choking coil of the transformer and the net-work or mains, are altogether absent. Further, according to the above method a steadily progressing voltage change of steps of equal increment or substantially so is obtained without a large number of tapping points and switches.

Having now described my invention what I claim as new and desire to secure by Letters Patent is:—

1. In dynamo electric machinery in combination a three-phase motor, three line terminals and an auto-transformer, a connection from one line terminal to the motor and from the other line terminals respectively to two limbs of the transformer, two switches connecting the other ends of the limbs of the auto-transformer to the aforesaid connection to the motor, two choking coils, connections between each coil respectively to the motor and from the remaining ends of the coils to a point in each limb of the auto-transformer, switches electrically connected in parallel with said coils and further switches connected between the line terminals and the tapping points of the transformer.

2. In dynamo electric machinery in combination a three-phase motor, three line terminals and an auto-transformer, a connection from one line terminal to the motor and from the other line terminals respectively to two limbs of the transformer, two switches connecting the other ends of the limbs of the auto-transformer to the aforesaid connection to the motor, two choking coils, said coils being of electrical dimensions to give the maximum permissible starting current, connections between each coil respectively to the motor and from the remaining ends of the coils to a point in each limb of the auto-transformer, switches electrically connected in parallel with said coils and further switches connected between the line terminals and the tapping points of the transformer.

3. In dynamo electric machinery in combination, means for starting a three-phase alternating current motor including a single-step auto-transformer, two choking coils electrically connected between the tapping points and the motor and means for short-circuiting the choking coils.

4. The method of starting a three phase motor, provided with starting auto-transformers and choking coils connected between certain of the motor terminals and points in the auto-transformers, which consists in connecting one terminal of each of the auto-transformers together and to one motor terminal, short-circuiting the choking coils, opening the said connections of the auto-transformers, and short-circuiting the parts of the transformers in which current still flows.

In testimony whereof, I affix my signature in presence of two witnesses.

ALBERT AICHELE.

Witnesses:
 CARL GUBLER,
 AUGUST RUEGG.